Patented Sept. 7, 1943

2,328,961

UNITED STATES PATENT OFFICE 2,328,961

TRIAZINE DERIVATIVES

Gaetano F. D'Alelio and James W. Underwood, Pittsfield, Mass., assignors to General Electric Company, a corporation of New York No Drawing. Application September 1, 1942, Serial No. 456,928

18 Claims. (Cl. 260—249.5)

This invention relates to new chemical compounds and more particularly to triazine derivatives. The invention especially is concerned with the production of new and useful amino esters of triazines.

The triazine derivatives of this invention may be represented by the following general formula:

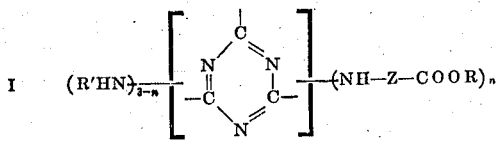

In the above formula $n$ represents an integer and is at least 1 and not more than 3, R represents a member of the class consisting of monovalent aliphatic hydrocarbon radicals and monovalent aromatic and nuclearly substituted, specifically nuclearly halogenated, aromatic hydrocarbon radicals, R' represents a member of the class which is the same as R and, in addition, hydrogen, and Z represents a member of the class consisting of divalent aliphatic hydrocarbon radicals and divalent aromatic and nuclearly substituted, specifically nuclearly halogenated, aromatic hydrocarbon radicals. From the above formula it will be noted that when $n$ is 3 there will be no —NHR' groups attached to the triazine nucleus.

Illustrative examples of monovalent radicals that R and R' in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g. cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, propenylphenyl, tertiary-butylphenyl, methylnaphthyl, etc.); aryl-substituted aliphatic (e. g., benzyl, cinnamyl, phenylethyl, phenylpropyl, etc.); and aryl, aliphatic-substituted aryl and aryl-substituted aliphatic radicals wherein one or more of the hydrogen atoms of the aryl nucleus have been substituted by, for example, a halogen, more particularly chlorine, bromine, fluorine or iodine. More specific examples of monovalent, nuclearly substituted, specifically nuclearly halogenated, aromatic hydrocarbon radicals that R and R' may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like. Preferably R' represents hydrogen.

Illustrative examples of divalent radicals that Z in the above formula may represent are: divalent aliphatic, e. g., ethylene, propylene (trimethylene), propenylene, butylene, isobutylene, pentylene, isopentylene, etc., including divalent cycloaliphatic, e. g., cyclopentylene, cyclohexylene, cyclohexenylene, cycloheptylene, etc.; divalent aromatic, e. g., phenylene, xenylene, naphthylene, etc.; divalent aliphatic-substituted aromatic, e. g., 2,4-tolylene, ethyl 2,5-phenylene, isopropyl 3,4-phenylene, 1-butyl 2,4-naphthylene, etc.; divalent aromatic-substituted aliphatic, e. g., phenylethylene, phenylpropylene, naphthylisobutylene, xylylene, alpha-(4-tolylene) beta'-butyl, etc.; radicals that may be classed either as divalent aliphatic-substituted aromatic or divalent aromatic-substituted aliphatic, e. g., 4,alpha-tolylene, 3,beta-phenyleneethyl, 4,alpha - xylylene, 2,gamma-phenylenebutyl, etc.; and their homologues, as well as those divalent radicals with one or more of their hydrogen atoms replaced by a substituent, e. g., sulfamyl, acyl, alkyl, alkenyl, hydroxy, alkoxy, aryloxy, a —COOR grouping in addition to the single —COOR grouping shown in the above formula, etc. Specific examples of substituted divalent radicals that Z may represent are: chlorophenylene, bromophenylene, chloroxenylene, chloronaphthylene, chlorotolylene, bromotolylene, ethoxyphenylene, acetophenylene, sulfamylphenylene, acetoxyphenylene, aminophenylene, hydroxyphenylene, phenoxyphenylene, methylphenylene (tolylene), allylphenylene, etc. Preferably Z is phenylene, tolylene or ethylene.

The new compounds of this invention may be used, for example, as pharmaceuticals, insecticides, fungicides, plasticizers and as intermediates in the preparation of derivatives thereof, e. g., methylol, methylene, etc., derivatives of the individual compound embraced by Formula I. These new compounds are especially valuable in the preparation of synthetic resinous compositions. Thus, they may be condensed with, for instance aldehydes, including polymeric aldehydes, hydroxyaldehydes and aldehyde-addition products, to yield condensation products having particular utility in the plastics and coating arts. Such condensation products are more fully described and are specifically claimed in our copending application Serial No. 461,769, filed October 12, 1942, as a continuation-in-part of the present application and assigned to the same assignee as the present invention.

Various methods may be employed to produce the chemical compounds of this invention. We prefer to prepare them by effecting reaction under heat between an aminotriazine and an amino ester. This reaction may be represented by the following general equation:

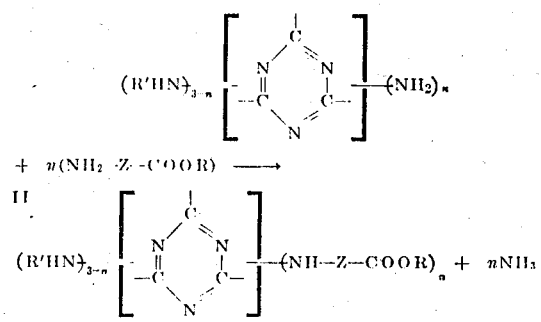

In the above equation $n$, R, R' and Z have the same meanings as given above with reference to Formula I. This reaction is carried out under conditions such as will result in the formation of ammonia as a by-product of the reaction. The reaction may be effected in the presence or absence of a suitable inert solvent or mixture of solvents. For example, the components may be caused to react in an inert organic solvent having a boiling point above 150° C., for example ethylene glycol, propylene glycol, diethylene glycol, dipropylene glycol, etc.

Illustrative examples of aminotriazines that may be used, depending upon the particular end-product desired, are:

Triamino s-triazine (melamine)
Amino di-(methylamino) s-triazine
Amino dianilino s-triazine
Amino di-(chloroanilino) s-triazine
Amino di-(ethylamino) s-triazine
Amino ditoduido s-triazine
Amino di-bromotoluido) s-triazine
Amino dixylidino s-triazine
Amino di-(fluoroanilino) s-triazine
Amino di-(iodotoluido) s-triazine
Amino di-(benzylamino) s-triazine
Amino di-(allylamino) s-triazine
Amino di-(cyclohexylamino) s-triazine
Amino di-(propylamino) s-triazine
Amino di-naphthylamino) s-triazine
Amino di-(cyclohexenylamino) s-triazine
Amino di-(isobutylamino) s-triazine
Amino di-(ethylanilino) s-triazine
Amino di-phenethylamino) s-triazine
2-amino 4-methylamino 6-ethylamino s-triazine
2-amino 4-propylamino 6-anilino s-triazine
2-amino 4-ethylamino 6-(chloroanilino) s-triazine
2-amino 4-anilino 6-toluido s-triazine
2-amino 4-xenylamino 6-naphthylamino s-triazine
2-amino 4-octylamino 6-(bromotoluido) s-triazine
2-amino 4-hexylamino 6-(iodonailino) s-triazine
2-amino 4-pentylamino 6-anilino s-triazine Illustrative examples of amino esters that may be used, depending upon the desired end-product, are:

The methyl amino benzoates (ortho, meta and para isomers)
The ethyl amino benzoates
The propyl amino benzoates
The isopropyl amino benzoates
The methyl amino chlorobenzoates
The ethyl amino bromobenzoates
The phenyl amino benzoates
The chlorophenyl amino benzoates
The chlorophenyl amino chlorobenzoates
The benzyl amino benzoates
The nuclearly chlorinated benzyl amino benzoates
The cyclohexyl amino benzoates
The methyl amino salicylates
The ethyl amino salicylates
The propyl amino salicylates
The benzyl amino salicylates
The cyclohexyl amino amino salicylates
Methyl glycinate
Ethyl glycinate
Phenyl glycinate
Tolyl glycinate
Methyl alpha-amino propionate
Ethyl beta-amino propionate
The methyl amino phenylacetates
The ethyl amino cinnamates
Propyl alpha-amino isobutyrate
Phenyl alpha-amino propionate
Tolyl alpha-amino propionate
Phenyl beta-amino propionate
Tolyl beta-amino propionate
Chlorophenyl glycinate Another method of preparing the novel compounds of this invention comprises effecting reaction between a halogenated triazine and an amino ester. This reaction may be represented by the following general equation:

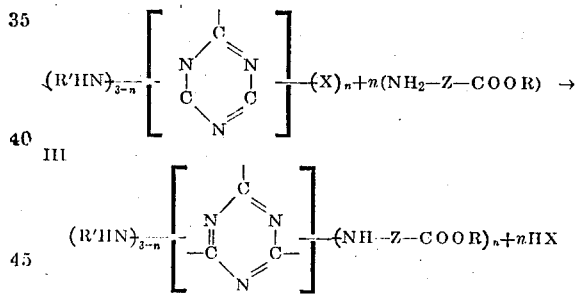

In the above equation X represents a halogen, and $n$, R, R' and Z have the same meanings as given above with reference to Formula I. This reaction advantageously is carried out in an anhydrous liquid medium, e. g., ether, benzene, toluene, etc., or in an excess of the amino ester. After the reaction has been completed and the crude product obtained, the latter is suitably treated to remove the hydrohalide, for example by washing with a dilute solution of a base such as sodium or potassium hydroxides.

Illustrative examples of halogenated s-triazines that may be used, depending upon the particular end-product sought, are:

2-chloro, 4,6-diamino s-triazine (chloro diamino s-triazine)
2-bromo 4,6-diamino s-triazine (bromo diamino s-triazine)
2,4-dichloro 6-amino s-triazine (dichloro amino s-triazine)
2,4,6-trichloro s-triazine (trichloro s-triazine)
2,4,6-tribromo s-triazine (tribromo s-triazine)
2-iodo 4,6-diamino s-triazine (iodo diamino s-triazine)
Chloro di-(ethylamino) s-triazine
Dichloro anilino s-triazine
Dibromo toluido s-triazine
Dichloro xylidino s-triazine Chloro di-(methylamino) s-triazine
2-chloro 4-ethylamino 6-amino s-triazine
2-chloro 4-methylamino 6-anilino s-triazine
2-bromo 4-propylamino 6-toluido s-triazine
2-chloro 4-benzylamino 6-amino s-triazine
Bromo di-(cyclohexylamino) s-triazine
Chloro di-(chloroanilino) s-triazine
Chloro ditoluido s-triazine Examples of amino esters that may be used, depending upon the desired end-product, are such as those mentioned above with reference to the first-described method of preparing the compounds of this invention.

In order that those skilled in the art better may understand how our invention may be carried into effect, the following examples are given by way of illustration and not by way of limitation. All parts are by weight.

Example 1

This example illustrates the preparation of ortho-carbomethoxyanilino diamino s-triazine, which also may be named 2-(ortho-carbomethoxyanilino) 4,6-diamino s-triazine, 4-(ortho-carbomethoxyanilino) 2,6-diamino s-triazine or 6-(ortho-carbomethoxyanilino) 2,4-diamino s-triazine, and which has the formula

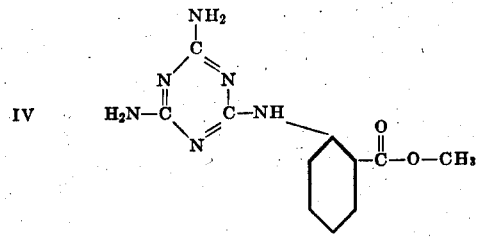

|  | Parts | Approximate mol ratio |
|---|---|---|
| Methyl anthranilate | 151 | 1 |
| Melamine | 126 | 1 | were mixed together and the mixture then was heated in a reaction vessel provided with a reflux condenser for 17 hours at 160° (bath temperature), followed by heating for an additional 17 hours at 180°–200° C. At the end of this reaction period the odor of ammonia no longer could be detected at the exit end of the reflux condenser. The reaction mass was extracted with ethyl alcohol, leaving a dark-colored crystalline product comprising ortho-carbomethoxyanilino diamino s-triazine. The impure product was purified by recrystallization from hot water, yielding purified, white ortho-carbomethoxyanilino diamino s-triazine. The purified material had a melting point above 250° C. When condensed with an aldehyde, specifically formaldehyde, it yielded resinous condensation products having properties that would make such materials eminently suitable for use in the plastics and coating arts.

In a similar manner meta-carbomethoxyanilino diamino s-triazine is prepared by using 151 parts of methyl meta-aminobenzoate instead of 151 parts of methyl anthranilate (methyl ortho-aminobenzoate); and para-carbomethoxyanilino diamino s-triazine is produced by using 151 parts of methyl para-aminobenzoate in place of 151 parts of methyl anthranilate.

Example 2

This example illustrates the preparation of tri-(ortho-carbomethoxyanilino) s-triazine.

|  | Parts | Approximate mol ratio |
|---|---|---|
| Methyl anthranilate | 502 | 4 |
| Melamine | 63 | 1 |

The same procedure was followed in effecting reaction between the melamine and methyl anthranilate as described under Example 1 with reference to the preparation of the mono-substituted diamino s-triazine. It will be noted that the above formula calls for an excess of 1 mol over that required theoretically for the preparation of the tri-substituted s-triazine.

In a similar manner tri-(meta-carbomethoxyanilino) s-triazine is prepared by using 302 parts of methyl meta-aminobenzoate instead of 302 parts of methyl anthranilate; and tri-(para-carbomethoxyanilino) s-triazine is produced by using 302 parts of methyl para-aminobenzoate in place of 302 parts of methyl anthranilate.

Example 3

Di-(ortho-carbomethoxyanilino) amino s-triazine is prepared in essentially the same manner as described under Example 1 with the exception that 302 parts of methyl anthranilate are used instead of 151 parts.

Example 4

Ortho-carbomethoxyanilino di-(methylamino) s-triazine is prepared in essentially the same manner as described under Example 1 with the exception that 154 parts of amino di-(methylamino) s-triazine are used in place of 126 parts of melamine.

Example 5

Di-(para-carbomethoxyanilino) amino s-triazine is prepared in essentially the same manner as described under Example 1 with the exception that 302 parts of methyl para-aminobenzoate are used instead of 151 parts of methyl anthranilate.

Example 6

Meta-carboethoxytoluido diamino s-triazine is prepared in essentially the same manner as described under Example 1 with the exception that 179 parts of ethyl metaamino toluate are used instead of 151 parts of methyl anthranilate.

Example 7

Ortho-, meta- or para-carbophenoxyanilino diamino s-triazine is prepared in essentially the same manner as described under Example 1 with the exception that 213 parts of phenyl ortho-, meta- or para-aminobenzoate are used in place of 151 parts of methyl anthranilate.

From the foregoing description it will be seen that the compounds embraced by Formula I include such classes of compounds as the following:

The carboaliphaticoxyaliphaticamino diamino [(—NHR)₂] s-triazines
The carboaromaticoxyaliphaticamino diamino [(—NHR)₂] s-triazines
The carbohalogenoaromaticoxyaliphaticamino diamino [(—NHR)₂] s-triazines
The carboaliphaticoxyaromaticamino diamino [(—NHR)₂] s-triazines
The carboaromaticoxyaromaticamino diamino [(—NHR)₂] s-triazines The carboaliphaticoxyhalogenoaromaticamino diamino [(—NHR)₂] s-triazines
The carbohalogenoaromaticoxyaromaticamino diamino [(—NHR)₂] s-triazines
The carboaromaticoxyhalogenoaromaticamino diamino [(—NHR)₂] s-triazines
The carbohalogenoaromaticoxyhalogenoaromaticamino diamino [(—NHR)₂] s-triazines
The di-(carboaliphaticoxyaliphaticamino) amino (—NHR) s-triazines
The di-(carboaromaticoxyaliphaticamino) amino (—NHR) s-triazines
The di-(carbohalogenoaromaticoxyaliphaticamino) amino (—NHR) s-triazines
The di-(carboaliphaticoxyaromaticamino) amino (—NHR) s-triazines
The di-(carboaromaticoxyaromaticamino) amino (—NHR) s-triazines
The di-(carboaliphaticoxyhalogenoaromaticamino) amino (—NHR) s-triazines
The di-(carbohalogenoaromaticoxyaromaticamino) amino (—NHR) s-triazines
The di-(carboaromaticoxyhalogenoaromaticamino) amino (—NHR) s-triazines
The di-(carbohalogenoaromaticoxyhalogenoaromaticamino) amino (—NHR) s-triazines
The tri-(carboaliphaticoxyaliphaticamino) s-triazines
The tri-(carboaromaticoxyaromaticamino) s-triazines
The tri-(carbohalogenoaromaticoxyaliphaticamino) s-triazines
The tri-(carboaromaticoxyaliphaticamino) s-triazines
The tri-(carboaliphaticoxyaromaticamino) s-triazines
The tri-(carboaliphaticoxyhalogenoaromaticamino) s-triazines
The tri-(carbohalogenoaromaticoxyaromaticamino) s-triazines
The tri-(carboaromaticoxyhalogenoaromaticamino) s-triazines
The tri-(carbohalogenoaromaticoxyhalogenoaromaticamino) s-triazines More specific examples of compounds embraced by Formula I that may be produced in accordance with the present invention are listed below:

Para-carboethoxyanilino diamino s-triazine
Meta-carbopropoxytoluido di-(methylamino) s-triazine
Carboethoxymethylamino diamino s-triazine
Di-(carboethoxyethylamino) amino s-triazine
Alpha-carboethoxyisobutylamino diamino s-triazine
Alpha-carbopropoxypropylamino dianilino s-triazine
Orhto-carbomethoxyanilino di-(ethylamino) s-triazine
Meta-carboethoxyanilino di-(butylamino) s-triazine
(Para-carbobenzyloxy meta-hydroxy anilino) di-(benzylamino) s-triazine
Carbobenzyloxymethylamino ethylamino amino s-triazine
Gamma-carbomethoxyamylamino diamina s-triazine
Gamma-carboethoxyamylamino ditoluido s-triazine
Gamma-carbobutoxybutylamino diamino s-triazine
Ortho - carboethoxyanilino carboethoxymethylamino amino s-triazine
Ortho-carboethoxyanilino di-(ethylanilin) s-triazine
Meta-carboethoxyanilino di-(phenethylamino) s-triazine
Para-carbomethoxyanilino di-(chloroanilino) s-triazine
Ortho-carboethoxyanilino di-(carboethoxymethylamino) s-triazine
Tri-(carbopropoxymethylamino) s-triazine
Tri-(carboethoxyanilino) s-triazines
Tri-(carbomethoxytoluido) s-triazines
Di-(meta-carbopropoxytoluido) amino s-triazine
Di-(ortho-carboethoxyanilino) methylamino s-triazine
Di-(ortho-carboethoxyanilino) anilino s-triazine
Di-(ortho-carboethoxyanilino) chloroanilino s-triazine
Di-(beta-carboethoxypropylamino) amino s-triazine
Di-(beta-carbophenoxyethylamino) amino s-triazine
Tri-(carbophenoxyanilino) s-triazines
Di-(para-carbomethoxyanilino) allylamino s-triazine
Di-(meta-carboethoxyanilino) cyclohexylamino s-triazine
Di-(ortho-carbopropoxyanilino) phenethylamino s-triazine In a manner similar to that described above with particular reference to the preparation of amino esters of 1,3,5- or symmetrical triazines (s-triazines), corresponding derivatives of the 1,2,4- or asymmetrical triazines and of the 1,2,3- or vicinal triazines may be prepared.

What we claim as new and desire to secure by Letters Patent of the United States is:

1. Chemical compounds corresponding to the general formula $$(R'HN)_{3-n}\left[\begin{array}{c} \text{triazine ring} \end{array}\right]-(NH-Z-COOR)_n$$

where $n$ represents an integer and is at least 1 and not more than 3, R represents a member of the class consisting of monovalent aliphatic hydrocarbon radicals and monovalent aromatic and nuclearly halogenated aromatic hydrocarbon radicals, R' represents a member of the class which is the same as R and in addition hydrogen, and Z represents a member of the class consisting of divalent aliphatic hydrocarbon radicals and divalent aromatic and nuclearly halogenated aromatic hydrocarbon radicals.

2. Chemical compounds as in claim 1 wherein R' represents hydrogen.
3. Chemical compounds as in claim 1 wherein R' represents hydrogen and R represents an alkyl radical.
4. Chemical compounds as in claim 1 wherein R' represents hydrogen and Z represents a divalent aromatic hydrocarbon radical.
5. Chemical compounds as in claim 1 wherein R' represents hydrogen, Z represents a divalent aromatic hydrocarbon radical and R represents an alkyl radical.
6. A carboaliphaticoxyaromaticamino diamino s-triazine.
7. A carboalkoxyarylamino diamino s-triazine.
8. A carboalkoxyanilino diamino s-triazine.
9. A carbomethoxyanilino diamino s-triazine.
10. Ortho-carbomethoxyanilino diamino s-triazine.
11. A di - (carboaliphaticoxyaromaticamino) amino s-triazine.

12. A di-(carboalkoxyanilino) amino s-triazine.
13. A tri-(carboaliphaticoxyaromaticamino) s-triazine.
14. A tri-(carboalkoxyanilino) s-triazine.
15. The method of preparing chemical compounds corresponding to the general formula

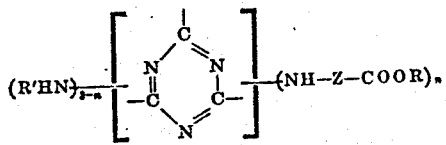

where $n$ represents an integer and is at least 1 and not more than 3, R represents a member of the class consisting of monovalent aliphatic hydrocarbon radicals and monovalent aromatic and nuclearly halogenated aromatic hydrocarbon radicals, R' represents a member of the class which is the same as R and in addition hydrogen, and Z represents a member of the class consisting of divalent aliphatic hydrocarbon radicals and divalent aromatic and nuclearly halogenated aromatic hydrocarbon radicals, said method comprising effecting reaction under heat between (1) aminotriazine corresponding to the general formula

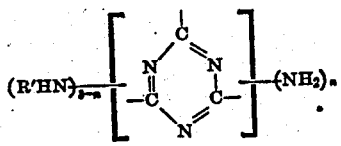

where R' has the meaning above given, and (2) an amino ester corresponding to the general formula $$n(NH_2—Z—COOR)$$

where $n$, Z and R have the meanings above given.

16. The method of preparing a carboalkoxyanilino diamino s-triazine which comprises effecting reaction under heat between approximately equimolecular proportions of melamine and an alkyl amino benzoate.

17. The method of preparing a di-(carboalkoxyanilino) amino s-triazine which comprises effecting reaction under heat between melamine and an alkyl amino benzoate in the ratio of one mol of the former to approximately two mols of the latter.

18. The method of preparing a tri-(carboalkoxyanilino) s-triazine which comprises effecting reaction under heat between melamine and an alkyl amino benzoate in the ratio of one mol of the former to at least three mols of the latter.

GAETANO F. D'ALELIO.
JAMES W. UNDERWOOD.

Certificate of Correction

Patent No. 2,328,961. September 7, 1943.

GAETANO F. D'ALELIO, ET AL.

It is hereby certified that errors appear in the printed specification requiring correction as follows: Page 2, first column, line 40, for "ditoduido" read *ditoluido*; line 41, before "bromotoluido" insert an opening parenthesis; line 50, before "naphthylamino" insert an opening parenthesis; line 54, before "phenethylamino" insert an opening parenthesis; line 65, for "(iodonailino)" read *(iodoanilino)*; and second column, line 14, strike out "amino" second occurrence; page 2, second column, line 35–40, for that portion of the formula reading

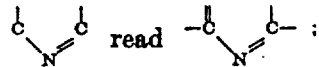

line 62, after "2-chloro" strike out the comma; page 3, second column, line 53, for "metaamino" read *meta-amino*; page 4, first column, line 58, for "Orhto" read *Ortho*; line 66, for "diamina" read *diamino*; line 74, for "(ethylanilin)" read *(ethylanilino)*; page 5, first column, line 24, after "(1)" insert *an*; and that the said Letters Patent should be read with these corrections therein that the same may conform to the record of the case in the Patent Office.

Signed and sealed this 2nd day of November, A. D. 1943.

[SEAL]

HENRY VAN ARSDALE,
*Acting Commissioner of Patents.*